(12) United States Patent
Notani et al.

(10) Patent No.: US 7,039,562 B1
(45) Date of Patent: May 2, 2006

(54) GRAPHICAL DESIGN AND AUTOMATIC GENERATION OF SUPPLY CHAIN COLLABORATION SERVICES CAPABLE OF UNDERSTANDING SUPPLY CHAIN SEMANTICS

(75) Inventors: Ranjit N. Notani, Southlake, TX (US); Vinatha Chaturvedi, Coppell, TX (US)

(73) Assignee: i2 Technologies US, Inc., Dallas, TX (US)

( * ) Notice: Subject to any disclaimer, the term of this patent is extended or adjusted under 35 U.S.C. 154(b) by 864 days.

(21) Appl. No.: 10/028,480

(22) Filed: Dec. 19, 2001

Related U.S. Application Data

(60) Provisional application No. 60/329,149, filed on Oct. 12, 2001.

(51) Int. Cl.
*G06F 17/50* (2006.01)

(52) U.S. Cl. ............................................. 703/1; 705/9

(58) Field of Classification Search ................... 703/1; 705/9, 205, 229; 707/10; 709/205, 229

See application file for complete search history.

(56) References Cited

U.S. PATENT DOCUMENTS

| | | | |
|---|---|---|---|
| 6,442,528 B1 * | 8/2002 | Notani et al. ................... | 705/9 |
| 6,671,673 B1 * | 12/2003 | Baseman et al. ............... | 705/7 |
| 6,823,340 B1 * | 11/2004 | Clark ........................... | 707/10 |
| 6,862,585 B1 * | 3/2005 | Planalp et al. .................. | 707/1 |

* cited by examiner

*Primary Examiner*—Albert W. Paladini
(74) *Attorney, Agent, or Firm*—Brian E. Harris; James E. Walton

(57) ABSTRACT

A computer-implemented system for graphical design and automatic generation of supply chain collaboration services capable of understanding supply chain semantics includes a collaboration service designer and a collaboration service generator. The collaboration service designer provides a graphical user interface (GUI), solicits from a user, using the GUI, information regarding the design for the supply chain collaboration service in a sequence of design steps, receives from the user, using the GUI, the solicited information, and generates a file based on the received information that contains a meta-model for the supply chain collaboration service. The collaboration service generator accesses the file containing the meta-model for the supply chain collaboration service. The collaboration service generator, using the meta-model, automatically generates the supply chain collaboration service, which is capable of understanding of supply chain semantics for an underlying supply chain.

38 Claims, 1 Drawing Sheet

US 7,039,562 B1

GRAPHICAL DESIGN AND AUTOMATIC GENERATION OF SUPPLY CHAIN COLLABORATION SERVICES CAPABLE OF UNDERSTANDING SUPPLY CHAIN SEMANTICS

RELATED APPLICATIONS

This patent application claims priority to U.S. provisional patent application U.S. Ser. No. 60/329,149 filed Oct. 12, 2001, and entitled "Graphical Design And Automatic Generation Of Supply Chain Collaboration Services Capable Of Understanding Supply Chain Semantics."

TECHNICAL FIELD OF THE INVENTION

This invention relates generally to supply chain collaboration and more particularly to the graphical design and automatic generation of supply chain collaboration services capable of understanding supply chain semantics.

BACKGROUND OF THE INVENTION

Supply chain collaboration services (such as, for example, procurement collaboration services, design collaboration services, and other collaboration services) may facilitate collaboration between enterprises in a supply chain. "Off the rack" collaboration services may be designed and generated for use by a number of different enterprises, without regard to the particular needs of any one enterprise or group of enterprises. In contrast, "custom" collaboration services may be designed and generated for use by a particular enterprise or group of enterprises. Custom collaboration services may better address the particular needs of a particular enterprise or group of enterprises, but there may be disadvantages associated with such collaboration services. On one hand, custom collaboration services may be designed and "hand-coded" by humans. Custom collaboration services designed and generated in this way may be capable of understanding supply chain semantics, but there may be substantial costs and time requirements associated with their design and generation. On the other hand, custom collaboration services may be designed and generated using computer-automated design (CAD) systems. CAD systems may reduce costs and time requirements associated with designing and generating custom collaboration services, but there is typically an inverse relationship between the degree to which CAD systems allow for semantic understanding in custom collaboration services and the degree to which CAD systems allow users to customize collaboration services. As a result, a user may typically have to choose between a high degree of semantic understanding and a high degree of customizability.

SUMMARY OF THE INVENTION

According to the present invention, disadvantages and problems associated with previous techniques for designing and generating collaboration services may be reduced or eliminated.

In one embodiment of the present invention, a computer-implemented system for graphical design and automatic generation of supply chain collaboration services capable of understanding supply chain semantics includes a collaboration service designer and a collaboration service generator. The collaboration service designer includes software. The collaboration service designer provides a graphical user interface (GUI) for soliciting from a user information regarding a design for a supply chain collaboration service and receiving from the user the solicited information regarding the design for the supply chain collaboration service. The collaboration service designer solicits from the user, using the GUI, information regarding the design for the supply chain collaboration service in a predetermined sequence of design steps. Particular information regarding one or more particular aspects of the design for the supply chain collaboration service is solicited at each design step. The collaboration service designer receives from the user, using the GUI, the solicited information regarding the design for the supply chain collaboration service in the predetermined sequence of design steps. The user is prevented from proceeding from a current design step to a subsequent design step until the particular information regarding the one or more particular aspects of the design for the supply chain collaboration service being solicited at the current design step is received from the user. The collaboration service designer generates a file based on the information regarding the design for the supply chain collaboration service received from the user. The file contains a meta-model for the supply chain collaboration service. The collaboration service designer communicates the file containing the meta-model for the supply chain collaboration service for access by a collaboration service generator. The collaboration service generator includes software. The collaboration service generator accesses the generated file containing the meta-model for the supply chain collaboration service. The collaboration service generator, using the meta-model for the supply chain collaboration service contained within the accessed file, automatically generates the supply chain collaboration service, the generated supply chain collaboration service capable of understanding of supply chain semantics for an underlying supply chain.

Particular embodiments of the present invention may provide one or more technical advantages. Particular embodiments may, for example, provide a GUI for designing a supply chain collaboration service, which may allow a user to more easily design collaboration services. Particular embodiments may provide a wizard for designing a supply chain collaboration service, which may similarly allow a user to more easily design supply chain collaboration services. Providing a GUI, wizard, or both for designing a supply chain collaboration service may additionally reduce time requirements typically associated with designing supply chain collaboration services. Particular embodiments may allow for substantial customizability in the design of a supply chain collaboration service, which may allow a user to better design a supply chain collaboration service for the particular needs of a particular enterprise or group of enterprises. Particular embodiments may automatically generate, based on a user design for a supply chain collaboration service, a supply chain collaboration service that includes a substantial understanding of supply chain semantics for an underlying supply chain, which may allow for greater functionality in the supply chain collaboration service. Particular embodiments may, in addition to automatically generating a supply chain collaboration service, automatically generate one or more GUIs for interaction between the supply chain collaboration service and one or more end users of the supply chain collaboration service.

Systems and methods incorporating one or more of these or other technical advantages may be well suited for modern supply chain collaboration environments. One or more other technical advantages may be readily apparent to those skilled in the art from the figures, descriptions, and claims included herein.

BRIEF DESCRIPTION OF THE DRAWINGS

To provide a more complete understanding of the present invention and the features and advantages thereof, reference is made to the following description taken in conjunction with the accompanying drawings, in which.

DETAILED DESCRIPTION OF EXAMPLE EMBODIMENTS

Figure 1:
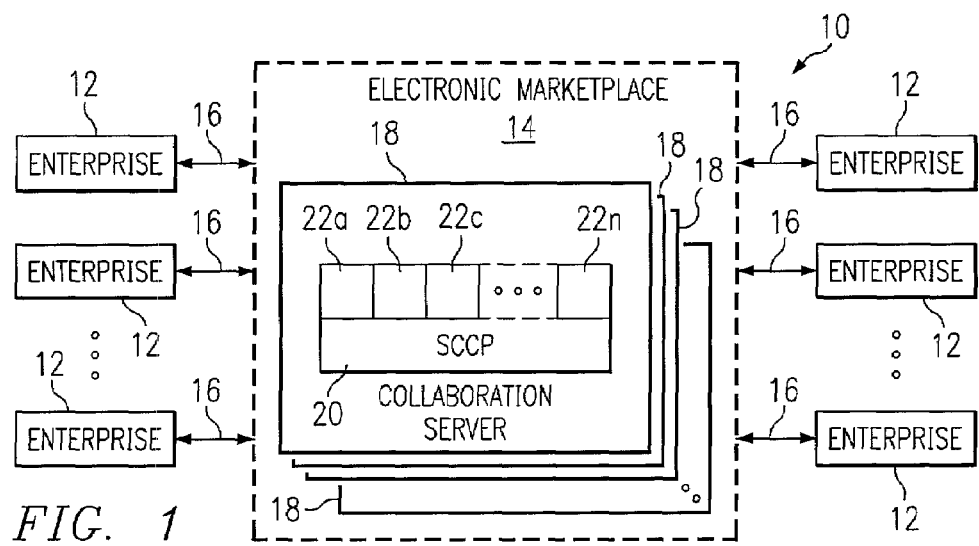
FIG. 1 illustrates an example computer-implemented system supporting supply chain collaboration.

FIG. 1 illustrates an example computer-implemented system 10 supporting supply chain collaboration. System 10 may include a number of enterprises 12 and at least one electronic marketplace 14 coupled to enterprises 12 using links 16, which may each include one or more local area networks (LANs), metropolitan area networks (MANs), wide area networks (WANs), a portion of the Internet, or any other appropriate wireline, optical, wireless, or other links. In general, electronic marketplace 14 may support supply chain collaboration between enterprises 12 in one or more supply chains. For example only and not by way of limitation, electronic marketplace 14 may support procurement collaboration between enterprises 12 in a supply chain. Such collaboration may, as an example, involve a first enterprise 12 communicating a request for quote (RFQ) to one or more other enterprises 12, which other enterprises 12 may communicate quotes to the first enterprise 12 in response to the RFQ. Electronic marketplace 14 may support such a collaboration by receiving the RFQ from the first enterprise 12, communicating the RFQ to the other enterprises 12 according to a procurement collaboration service hosted at electronic marketplace 14, and possibly performing other tasks associated with supporting procurement collaboration, as described more fully below.

Electronic marketplace 14 may include one or more collaboration servers 18 supporting one or more supply chain collaboration platforms 20 (SCCPs). One or more collaboration servers 18 may support one or more SCCPs 20 according to any suitable arrangement. For example, a single SCCP 20 may be supported by a number of different collaboration servers 18, each collaboration server 18 running a different instantiation of the SCCP 20. Electronic marketplace 14 may share one or more resources with one or more enterprise 12, according to particular needs. An SCCP 20 may include software providing shared utilities and other resources for a number of hosted collaborations services 22. For example, an SCCP 20 may provide a collaboration infrastructure including a static supply chain model, a security framework, a permissibility framework, an event framework, a problem framework, and any other suitable collaboration infrastructure components. Hosted collaboration services 22 may each include software providing a particular collaboration-related service for one or more enterprises 12. As an example, collaboration service 22a may include software providing a set of functionalities that collectively provide a procurement collaboration service such as that described above. As another example, collaboration service 22b may include software providing a set of functionalities that collectively provide a design collaboration service. Although particular collaboration services 22 are described herein, the present invention contemplates any suitable supply chain collaboration services according to particular needs and capabilities. Collaborations services 22 may each utilize one or more resources provided by SCCP 20.

The level of functionality provided by a collaboration service 22 may depend on the degree to which collaboration service 22 understands supply chain semantics. "Semantics" may include the meaning of instructions and data (in contrast to the format of such instructions and data), and "supply chain semantics" may include semantics pertaining to an underlying supply chain. "Semantic understanding" may include the ability to recognize instructions and data, determine the meaning of such instructions and data, and make decisions based on the determined meaning of such instructions and data. A collaboration service 22 that understands supply chain semantics to a greater degree may provide a higher level of functionality than a collaboration service 22 that understands such semantics to a lesser degree. For example, a collaboration service 22 that understands the necessary supply chain semantics may receive a supply chain message (which may include an RFQ, a quote in response to an RFQ, or any other suitable supply chain message), access all or certain portions of the contents of the message, determine the meaning of the accessed contents of the message, and make one or more decisions based on the determined meaning of the accessed contents of the message regarding the handling of the message, such as, for example, the routing of the message, error detection and handling, or other handling issues. In contrast, a collaboration service 22 that does not understand the necessary supply chain semantics may be unable to determine the meaning of the contents of a supply chain message or make decisions regarding the handling of the message based on the contents of the message and may, therefore, be limited in its functionality to simply receiving the message and, in response, communicating the message to a predetermined physical or logical location without regard to the contents of the message.

Understanding of supply chain semantics may vary from collaboration service 22 to collaboration service 22 supported by SCCP 20. For example, SCCP 20 may support "off the rack" collaboration services 22 designed and generated for use by a number of different enterprises 12 without regard to the particular needs of any one enterprise 12 or group of enterprises 12. Typically, such collaboration services 22 may include a substantial understanding of supply chain semantics. SCCP 20 may also support "custom" collaboration services 22 designed and generated for use by a particular enterprise 12 or group of enterprises 12. Custom collaboration services 22 may be designed and generated in any suitable manner. As an example, custom collaboration services 22 supported by SCCP 20 may be designed and "hand-coded" by humans. Typically, custom collaboration services 22 designed and generated in this way include a substantial understanding of supply chain semantics. As another example, custom collaboration services 22 supported by SCCP 22 may be designed and generated using computer-automated design (CAD) systems allowing a relatively high degree of semantic understanding in custom collaborations services 22, but a relatively low degree of customizability in such services 22. Typically, custom collaboration services 22 designed using such CAD systems include a substantial understanding of supply chain semantics. As another example, custom collaboration services 22 supported by SCCP 20 may be designed and generated using CAD systems allowing a relatively low degree of semantic understanding in custom collaboration services 22, but a relatively high degree of customizability in such services 22. Typically, custom collaboration services 22 designed using such CAD systems do not include a substantial understanding of supply chain semantics. As another example, SCCP 20 may support custom collaboration services designed and generated according to the present invention using a collaboration service designer and a collaboration service generator (described more fully below), which may collectively allow for a relatively high degree of semantic understanding in custom collaboration services 22 and a relatively high degree of customizability in such services 22. Collaboration services 22 designed and generated using such a collaboration service designer and collaboration service generator may include a substantial understanding of supply chain semantics. Although SCCP 20 is described as supporting particular collaboration services 22, the present invention contemplates SCCP 20 hosting any suitable number and combination of collaboration services 22.

Figure 2:
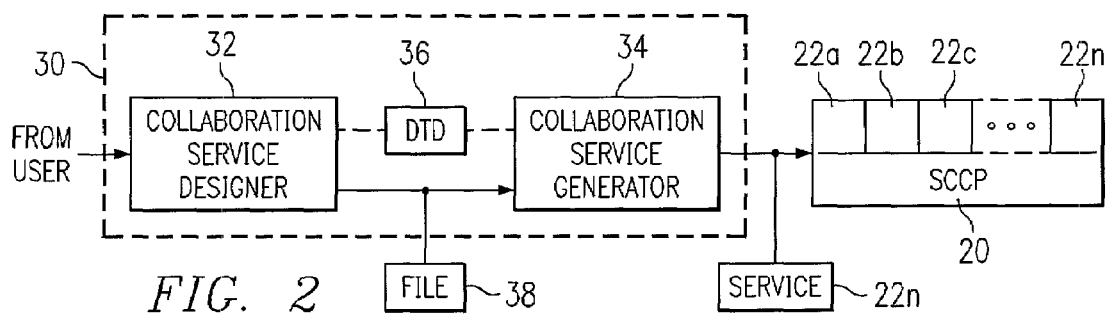
FIG. 2 illustrates an example computer-implemented system for graphical design and automatic generation of supply chain collaboration services capable of understanding supply chain semantics.

FIG. 2 illustrates an example computer-implemented system 30 for graphical design and automatic generation of supply chain collaboration services capable of understanding supply chain semantics. System 30 may include a collaboration service designer 32 and a collaboration service generator 34. In one embodiment, collaboration service designer 32 may include JAVA-based or other suitable software executable on a computer system accessible to a user. In general, as described more fully below, collaboration service designer 32 may solicit information regarding the design of a collaboration service 22 from a user in a series of design steps, generate an Extensible Markup Language (XML) or other suitable file based on the information provided by the user, and communicate the XML file to collaboration service generator 34, which may, substantially immediately or some time in the future, generate a collaboration service 22 using the information within the XML file suitable for execution in connection with SCCP 20.

Collaboration service designer 32 may provide a wizard and associated graphical user interface (GUI) to solicit information regarding the design of a collaboration service 22 from a user. A user may access the GUI using a computer monitor or in any other suitable manner, and may provide information solicited by the GUI using a keyboard, mouse, touch screen, or any other suitable device. The GUI may include a series of displays that each solicit from the user information regarding one or more particular aspects of a collaboration service 22, and each display may include text, icons, drop down or other menus, fields for entering information, and other suitable mechanisms for soliciting information from a user. The displays may be presented to the user in a particular order, and the user may be prevented from proceeding from one display to another (and thus proceeding from one design step to another) until the user has provided certain information regarding the design of a collaboration service 22 associated with that display. In this way, collaboration service designer 32 may guide a user through the design of a collaboration service 22.

Collaboration service designer 32 may expose only certain aspects of a collaboration service 22 to customization by a user. For example, collaboration service designer 32 may provide through its GUI only certain design options to a user, which may limit the customizability of collaboration services 22 designed using collaboration service designer 32. Collaboration service designer 32 may access one or more Document Type Definitions (DTDs) 36 to determine which aspects of a collaboration service 22 to expose to a user. A DTD 36 may include a meta-language for a particular application. As an example only and not by way of limitation, a user may be provided design options making the following possible with respect to a collaboration service 22: (A) the creation of hierarchical collaborative transaction types; (B) the creation of role types associated with an underlying supply chain; (C) the association of collaborations supported by the collaboration service 22 with arbitrary elements of an underlying supply chain, such as items, customers, suppliers, sites, resources, buffers, product hierarchies, geographic hierarchies, etc.; (D) the association of collaborations supported by the collaboration service 22 with arbitrary composite elements of an underlying supply chain, such as item-supplier composite elements or customer-supplier-supplier resource composite elements; (E) the inheritance of element associations by a hierarchical collaboration transaction type; (F) the creation of state models for collaborations supported by the collaboration service 22 that are a function of the state of an underlying supply chain; (G) the creation of exception detection logic for collaborations supported by the collaboration service 22 that is a function of the state of an underlying supply chain; (H) the creation of permissions for collaborations supported by the collaboration service 22 derived from permissions that are part of an underlying supply chain; (I) the creation of end-user GUIs that may enable an end-user to locate collaborations supported by the collaboration service 22 by navigating base supply chain elements; and (J) the creation of collaborative transaction meta-models that may differ from each other in terms of arbitrarily defined partnership groupings. Although particular design options are described herein, the present invention contemplates any suitable design options being provided to a user, allowing any suitable customization of a collaboration service 22.

Collaboration service designer 32 may generate an XML or other suitable file 38 containing information reflecting a collaboration service 22 designed by a user and communicate or otherwise make file 38 accessible to collaboration service generator 34, which may generate the designed collaboration service 22 using the information within file 38. Although an XML file 38 is primarily described, the present invention contemplates any suitable file 38 in any suitable format being generated by collaboration service designer 32 for access by collaboration service generator 34. File 38 may be stored indefinitely between its creation and its being accessed by collaboration service generator 34, according to particular needs. A file 38 generated by collaboration service designer 32 may contain a meta-model describing a collaboration service 22. A meta-model for a collaboration service 22 may include a number of meta-model elements which may each describe an aspect of collaboration service 22. For example, a meta-model for a collaboration service 22 may include the following meta-model elements: (A) one or more meta-model elements describing the role types that may participate in a collaboration supported by collaboration service 22; (B) one or more meta-model elements describing the dimensions (which may also be referred to as "supply chain elements") of a collaboration supported by collaboration service 22, which dimensions may include, one or more items, buffers, sites, resources, and other suitable dimensions; (C) one or more meta-model elements describing the dimensionality of a collaboration supported by collaboration service 22, which dimensionality may include a particular combination of supply chain elements, such as, for example, item-ship-from site-ship-to site-buffer; (D) one or more meta-model elements describing dimensionalities accessible to particular role types; (E) one or more meta-model elements describing a collaborative transaction type (such as, for example, RFQ) in relation to the dimensionality of a collaboration supported by collaboration service 22, which collaborative transaction type may, for example, be defined in terms of the structure (such as, for example, hierarchical structure) and data elements of such a collaboration, a state model (or other suitable model) describing the life-cycle of such a collaboration, data elements accessible to particular role types at particular stages of the life-cycle of such a collaboration (meaning the state of the transaction in relation to the state model), actions executable by a role type at particular stages of the life-cycle of such a collaboration (meaning the state of the transaction in relation to the state model), and whether such a collaboration may involve two or more supply chain collaboration platforms (which may require synchronization among the platforms); (F) one or more meta-model elements describing one or more shared computations, problems, or alerts defined within the specified collaboration transaction type that may be accessible to two or more participants involved in a collaboration supported by collaboration service 22 (which computations, problems, or alerts may be defined as shared Java classes associated with the collaborative transaction type; and (G) one or more meta-model elements describing one or more time horizons for a collaboration supported by collaboration service 22 (which time horizons may be stated in days, weeks, months, etc.). Although particular meta-model elements are described herein, the present invention contemplates any suitable meta-model elements being included within a meta-model. For example, a meta-model may include any suitable combination of the meta-model elements described above and, in addition or as an alternative, any other suitable meta-model elements.

Collaboration service generator 34 may include software executable on the same computer system as collaboration service designer 32, an associated computer system, or any other suitable computer system, according to particular needs. In general, collaboration service generator 34 may receive an XML or other suitable file 38 from collaboration service designer 32 and, using the meta-model contained within file 38, generate a collaboration service 22 that understands supply chain semantics (at least to the extent necessary to support the functionalities of the designed collaboration service 22). Although collaboration services 22 are primarily described as being generated using XML files 38, the present invention contemplates collaboration services 22 being generated using any suitable files 38 in any suitable format. Collaboration service generator 34 may generate a collaboration service 22 in any suitable manner. For example, collaboration service generator 34 may generate a collaboration service 22 using a file 38 created by collaboration service designer 32 in much the same way that a compiler generates machine-readable code using a source file containing source statements written in a high-level programming language. Collaboration service generator 34 may itself understand the supply chain semantics of an underlying supply chain such that collaboration service generator 34 may "add" semantic understanding to designed collaboration services 22 that may be needed to support their functionalities. Collaboration service generator 34 may also access one or more DTDs (described above) to generate collaboration services 22. Upon generating a collaboration service 22, collaboration service generator 34 may communicate collaboration service 22 to electronic marketplace 14, where collaboration service 22 may be supported by SCCP 20. In addition to generating collaboration services 22, collaboration service generator 34 may, in particular embodiments, generate GUIs for interaction between generated collaboration services 22 and end-users of such collaboration services 22, as appropriate. A GUI generated by collaboration service generator 34 for interaction with a generated collaboration service 22 may be included within collaboration service 22 as part of the functionality of collaboration service 22 itself.

Figure 3:
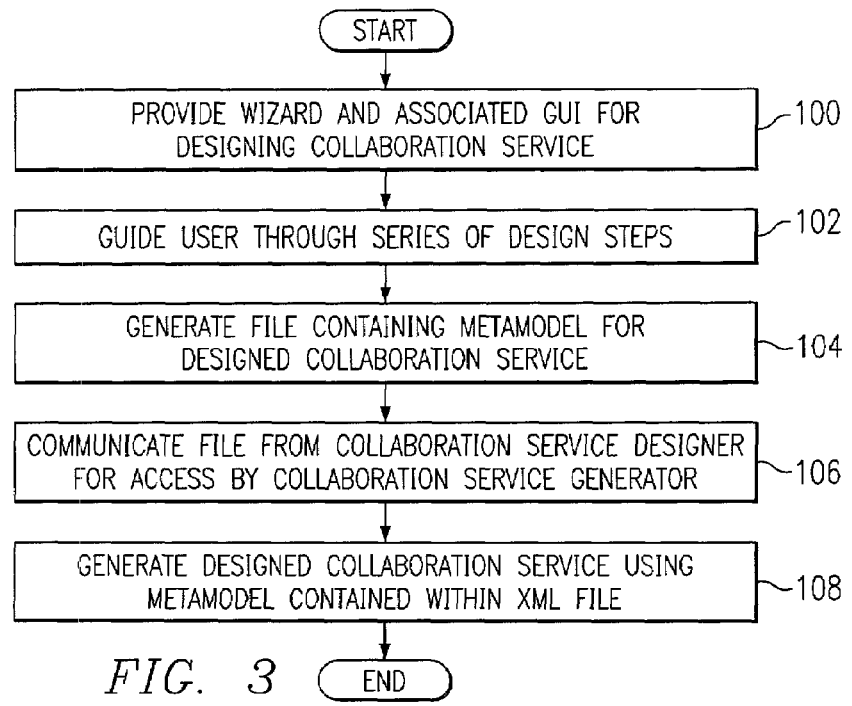
FIG. 3 illustrates an example computer-implemented method for graphical design and automatic generation of supply chain collaboration services capable of understanding supply chain semantics.

FIG. 3 illustrates an example method for the graphical design and automatic generation of collaboration services capable of understanding supply chain semantics. The method begins at step 100, where collaboration service designer 32 provides a wizard and associated GUI for designing a collaboration service 22. As described above, the GUI may solicit information regarding the design of a collaboration service 22 from a user in a series of design steps. As described above, such information may be solicited from the user in any suitable manner. At step 102, collaboration service designer 32 guides the user through the series of design steps. As described above, this may involve a series of displays that are each associated with one or more particular aspects of the design of a collaboration service 22 being presented to the user. Each display may solicit information regarding the one or more associated aspects of a collaboration service 22. As described above, the displays may be presented to the user in a particular order, and the user may be prevented from proceeding from one display to another (and thus proceeding from one design step to another) until the user has provided certain information regarding the design of a collaboration service 22 associated with that display. At step 104, collaboration service designer 32 generates an XML or other suitable file 38 containing a meta-model for the designed collaboration service 22. As described above, the meta-model contained within file 38 may include a number of meta-model elements. At step 106, file 38 is communicated from collaboration service designer 32 for access by collaboration service generator 34. Collaboration service designer 32 may, as described above, store file 38 indefinitely before communicating file 38 to collaboration service generator 34. In particular embodiments, it may not be necessary that collaboration service designer 32 and collaboration service generator 34 run at substantially the same time. At step 108, collaboration service generator 34 generates the designed collaboration service 22 using the meta-model contained within 38, and the method ends. As described above, collaboration service generator 34 may generate a collaboration service 22 in any suitable manner, such that the generated collaboration service 22 may understand supply chain semantics to the extent necessary to support the functionalities of the designed collaboration service 22.

Although the present invention has been described with several embodiments, divers changes, substitutions, variations, alterations, and modifications may be suggested to one skilled in the art, and it is intended that the invention may encompass all such changes, substitutions, variations, alterations, and modifications fall within the spirit and scope of the appended claims.

What is claimed is:

1. A computer-implemented system for graphical design and automatic generation of supply chain collaboration services capable of understanding supply chain semantics, the system comprising:
   a collaboration service designer, comprising software operable to:
      provide a graphical user interface (GUI) for soliciting from a user information regarding a design for a supply chain collaboration service and receiving from the user the solicited information regarding the design for the supply chain collaboration service;
      solicit from the user, using the GUI, information regarding the design for the supply chain collaboration service in a predetermined sequence of design steps, particular information regarding one or more particular aspects of the design for the supply chain collaboration service being solicited at each design step;
      receive from the user, using the GUI, the solicited information regarding the design for the supply chain collaboration service in the predetermined sequence of design steps, the user being prevented from proceeding from a current design step to a subsequent design step until the particular information regarding the one or more particular aspects of the design for the supply chain collaboration service being solicited at the current design step is received from the user;
      generate a file based on the information regarding the design for the supply chain collaboration service received from the user, the file containing a meta-model for the supply chain collaboration service; and
      communicate the file containing the meta-model for the supply chain collaboration service for access by a collaboration service generator; and
   the collaboration service generator, comprising software operable to:
      access the generated file containing the meta-model for the supply chain collaboration service; and
      using the meta-model for the supply chain collaboration service contained within the accessed file, automatically generate the supply chain collaboration service, the generated supply chain collaboration service capable of understanding of supply chain semantics for an underlying supply chain.

2. The system of claim 1, wherein the collaboration service designer comprises a wizard.

3. The system of claim 1, wherein the GUI generates a plurality of displays for presentation to the user, each display operable to solicit and receive from a user particular information regarding one or more particular aspects of the design for the supply chain collaboration service; and
   each design step is associated with a particular display presented to the user, the particular display making one or more associated design options available to the user.

4. The system of claim 1, wherein the collaboration service designer is operable to access one or more document type definitions (DTDs) to determine one or more particular design options to make available to the user through the GUI in connection with each design step.

5. The system of claim 4, wherein the collaboration service designer is operable to make available to the user through the GUI a first design option allowing for creation of hierarchical collaborative transaction types, a second design option allowing for creation of roles types associated with an underlying supply chain, and at least one additional design option.

6. The system of claim 1, wherein the file comprises an Extensible Markup Language (XML) file.

7. The system of claim 1, wherein:
   the collaboration service designer and collaboration service generator are separate software components running on physically distinct computer systems; and
   the file generated by the collaboration service designer containing the meta model for the supply chain collaboration service is stored for later access by the collaboration service generator.

8. The system of claim 1, wherein the meta-model comprises a plurality of meta-model elements comprising one or more meta-model elements describing roles types for the supply chain collaboration service, one or more meta-model elements describing one or more dimensions for the supply chain collaboration service, and at least one additional meta-model element.

9. The system of claim 1, wherein the meta-model comprises a plurality of meta-model elements, the meta-model elements comprising one or more of the following:
   role types;
   dimensions each comprising a supply chain element;
   dimensionalities each comprising a combination of supply chain elements; access of particular role types to particular dimensionalities;
   collaborative transaction types relative to particular dimensionalities; shared operations visible to the at least two enterprises; and
   temporal structures of collaborative transactions.

10. The system of claim 9, wherein a meta-model element specifying a collaborative transaction type relative to a particular dimensionality comprises one or more of the following:
    structure of the transaction;
    data elements associated with the transaction;
    a state model describing a life cycle of the transaction;
    access that a role type has to data elements of the transaction relative to a state of the transaction;
    actions that a role type can execute on the transaction relative to a state of the transaction; and
    whether the transaction is a system of record or whether synchronization must occur with another system of record.

11. The system of claim 1, wherein the collaboration service designer is operable to generate one or more GUIs for interaction between the collaboration service and an end-user of the collaboration service.

12. The system of claim 1, wherein:
    the system further comprises an electronic marketplace supporting a supply chain collaboration platform (SCCP); and
    the generated collaboration service is one of a plurality of collaboration services hosted by the electronic marketplace for execution using the SCCP.

13. A computer-implemented method for graphical design and automatic generation of supply chain collaboration services capable of understanding supply chain semantics, the method comprising:
    providing a graphical user interface (GUI) for soliciting from a user information regarding a design for a supply chain collaboration service and receiving from the user the solicited information regarding the design for the supply chain collaboration service;
    soliciting from the user, using the GUI, information regarding the design for the supply chain collaboration service in a predetermined sequence of design steps, particular information regarding one or more particular aspects of the design for the supply chain collaboration service being solicited at each design step;

receiving from the user, using the GUI, the solicited information regarding the design for the supply chain collaboration service in the predetermined sequence of design steps, the user being prevented from proceeding from a current design step to a subsequent design step until the particular information regarding the one or more particular aspects of the design for the supply chain collaboration service being solicited at the current design step is received from the user;

generating a file based on the information regarding the design for the supply chain collaboration service received from the user, the file containing a meta-model for the supply chain collaboration service;

accessing the generated file containing the meta-model for the supply chain collaboration service; and using the meta-model for the supply chain collaboration service contained within the accessed file, automatically generating the supply chain collaboration service, the generated supply chain collaboration service capable of understanding of supply chain semantics for an underlying supply chain.

14. The method of claim 13, wherein the GUI is provided using a wizard.

15. The method of claim 13, wherein the GUI generates a plurality of displays for presentation to the user, each display operable to solicit and receive from a user particular information regarding one or more particular aspects of the design for the supply chain collaboration service; and each design step is associated with a particular display presented to the user, the particular display making one or more associated design options available to the user.

16. The method of claim 13, further comprising accessing one or more document type definitions (DTDs) to determine one or more particular design options to make available to the user through the GUI in connection with each design step.

17. The method of claim 16, comprising making available to the user through the GUI a first design option allowing for creation of hierarchical collaborative transaction types, a second design option allowing for creation of roles types associated with an underlying supply chain, and at least one additional design option.

18. The method of claim 13, wherein the file comprises an Extensible Markup Language (XML) file.

19. The method of claim 13, wherein:

providing the GUI, soliciting from the user information regarding the design for the supply chain collaboration service, receiving from the user the solicited information regarding the design for the supply chain collaboration service, and generating the file containing the meta-model for the supply chain collaboration service are all performed by a first software component running on a first computer system;

accessing the generated file containing the meta-model for the supply chain collaboration service and automatically generating the supply chain collaboration service are both performed by a second software component running on a second computer system;

the first and second software components are separate from each other;

the first and second computer systems are physically distinct from each other; and the method further comprises storing, for later access, the file generated by the collaboration service designer containing the meta-model for the supply chain collaboration service.

20. The method of claim 13, wherein the meta-model comprises a plurality of meta-model elements comprising one or more meta-model elements describing roles types for the supply chain collaboration service, one or more meta model elements describing one or more dimensions for the supply chain collaboration service, and at least one additional meta-model element.

21. The method of claim 13, wherein the meta-model comprises a plurality of meta-model elements, the meta-model elements comprising one or more of the following:

role types;

dimensions each comprising a supply chain element;

dimensionalities each comprising a combination of supply chain elements;

access of particular role types to particular dimensionalities;

collaborative transaction types relative to particular dimensionalities;

shared operations visible to the at least two enterprises; and temporal structures of collaborative transactions.

22. The method of claim 21, wherein a meta-model element specifying a collaborative transaction type relative to a particular dimensionality comprises one or more of the following:

structure of the transaction;

data elements associated with the transaction;

a state model describing a life cycle of the transaction;

access that a role type has to data elements of the transaction relative to a state of the transaction;

actions that a role type can execute on the transaction relative to a state of the transaction; and whether the transaction is a system of record or whether synchronization must occur with another system of record.

23. The method of claim 13, further comprising generating one or more GUIs for interaction between the collaboration service and an end-user of the collaboration service.

24. The method of claim 13, wherein the generated collaboration service is one of a plurality of collaboration services hosted by an electronic marketplace for execution using a supply chain collaboration platform (SCCP) supported by the electronic marketplace.

25. Software for graphical design and automatic generation of supply chain collaboration services capable of understanding supply chain semantics, the software embodied in computer-readable media and when executed operable to:

provide a graphical user interface (GUI) for soliciting from a user information regarding a design for a supply chain collaboration service and receiving from the user the solicited information regarding the design for the supply chain collaboration service;

solicit from the user, using the GUI, information regarding the design for the supply chain collaboration service in a predetermined sequence of design steps, particular information regarding one or more particular aspects of the design for the supply chain collaboration service being solicited at each design step;

receive from the user, using the GUI, the solicited information regarding the design for the supply chain collaboration service in the predetermined sequence of design steps, the user being prevented from proceeding from a current design step to a subsequent design step until the particular information regarding the one or more particular aspects of the design for the supply chain collaboration service being solicited at the current design step is received from the user;

generate a file based on the information regarding the design for the supply chain collaboration service received from the user, the file containing a meta-model for the supply chain collaboration service;

access the generated file containing the meta-model for the supply chain collaboration service; and using the meta-model for the supply chain collaboration service contained within the accessed file, automatically generate the supply chain collaboration service, the generated supply chain collaboration service capable of understanding of supply chain semantics for an underlying supply chain.

26. The software of claim 25, wherein the GUI is provided using a wizard.

27. The software of claim 25, wherein the GUI generates a plurality of displays for presentation to the user, each display operable to solicit and receive from a user particular information regarding one or more particular aspects of the design for the supply chain collaboration service; and each design step is associated with a particular display presented to the user, the particular display making one or more associated design options available to the user.

28. The software of claim 25, further operable to access one or more document type definitions (DTDs) to determine one or more particular design options to make available to the user through the GUI in connection with each design step.

29. The software of claim 28, operable to make available to the user through the GUI a first design option allowing for creation of hierarchical collaborative transaction types, a second design option allowing for creation of roles types associated with an underlying supply chain, and at least one additional design option.

30. The software of claim 25, wherein the file comprises an Extensible Markup Language (XML) file.

31. The software of claim 25, wherein:

a first software component of the software running on a first computer system is operable to provide the GUI, solicit from the user information regarding the design for the supply chain collaboration service, receive from the user the solicited information regarding the design for the supply chain collaboration service, and generate the file containing the meta-model for the supply chain collaboration service;

a second software component of the software running on a second computer system accessing the generated file containing the meta-model for the supply chain collaboration service and automatically generating the supply chain collaboration service;

the first and second software components are separate from each other;

the first and second computer systems are physically distinct from each other; and the software is further operable to store, for later access, the file generated by the collaboration service designer containing the meta-model for the supply chain collaboration service.

32. The software of claim 25, wherein the meta-model comprises a plurality of meta-model elements comprising one or more meta-model elements describing roles types for the supply chain collaboration service, one or more meta model elements describing one or more dimensions for the supply chain collaboration service, and at least one additional meta-model element.

33. The software of claim 25, wherein the meta-model comprises a plurality of meta-model elements, the meta-model elements comprising one or more of the following:

role types;

dimensions each comprising a supply chain element; dimensionalities each comprising a combination of supply chain elements; access of particular role types to particular dimensionalities; collaborative transaction types relative to particular dimensionalities; shared operations visible to the at least two enterprises; and temporal structures of collaborative transactions.

34. The software of claim 33, wherein a meta-model element specifying a collaborative transaction type relative to a particular dimensionality comprises one or more of the following:

structure of the transaction; data elements associated with the transaction;

a state model describing a life cycle of the transaction;

access that a role type has to data elements of the transaction relative to a state of the transaction;

actions that a role type can execute on the transaction relative to a state of the transaction; and whether the transaction is a system of record or whether synchronization must occur with another system of record.

35. The software of claim 25, further operable to generate one or more GUIs for interaction between the collaboration service and an end-user of the collaboration service.

36. The software of claim 25, wherein the generated collaboration service is one of a plurality of collaboration services hosted by an electronic marketplace for execution using a supply chain collaboration platform (SCCP) supported by the electronic marketplace.

37. A computer-implemented system for graphical design and automatic generation of supply chain collaboration services capable of understanding supply chain semantics, the system comprising:

means for providing a graphical user interface (GUI) for soliciting from a user information regarding a design for a supply chain collaboration service and receiving from the user the solicited information regarding the design for the supply chain collaboration service;

means for soliciting from the user, using the GUI, information regarding the design for the supply chain collaboration service in a predetermined sequence of design steps, particular information regarding one or more particular aspects of the design for the supply chain collaboration service being solicited at each design step;

means for receiving from the user, using the GUI, the solicited information regarding the design for the supply chain collaboration service in the predetermined sequence of design steps, the user being prevented from proceeding from a current design step to a subsequent design step until the particular information regarding the one or more particular aspects of the design for the supply chain collaboration service being solicited at the current design step is received from the user;

means for generating a file based on the information regarding the design for the supply chain collaboration service received from the user, the file containing a meta-model for the supply chain collaboration service;

means for accessing the generated file containing the meta-model for the supply chain collaboration service; and means for, using the meta-model for the supply chain collaboration service contained within the accessed file, automatically generating the supply chain collaboration service, the generated supply chain collaboration service capable of understanding of supply chain semantics for an underlying supply chain.

38. A computer-implemented system for graphical design and automatic generation of supply chain collaboration services capable of understanding supply chain semantics, the system comprising:

a collaboration service designer, comprising software operable to:

provide a graphical user interface (GUI) for soliciting from a user information regarding a design for a supply chain collaboration service and receiving from the user the solicited information regarding the design for the supply chain collaboration service, the GUI operable to generate a plurality of displays for presentation to the user, each display operable to solicit and receive from the user particular information regarding one or more particular aspects of the design for the supply chain collaboration service;

solicit from the user, using the GUI, information regarding the design for the supply chain collaboration service in a predetermined sequence of design steps, particular information regarding one or more particular aspects of the design for the supply chain collaboration service being solicited at each design step, each design step being associated with a particular display presented to the user, the particular display making one or more associated design options available to the user;

receive from the user, using the GUI, the solicited information regarding the design for the supply chain collaboration service in the predetermined sequence of design steps, the user being prevented from proceeding from a current design step to a subsequent design step until the particular information regarding the one or more particular aspects of the design for the supply chain collaboration service being solicited at the current design step is received from the user;

generate an Extensible Markup Language (XML) file based on the information regarding the design for the supply chain collaboration service received from the user, the XML file containing a meta-model for the supply chain collaboration service; and communicate the XML file containing the meta-model for the supply chain collaboration service for access by a collaboration service generator; and the collaboration service generator, comprising software operable to:

access the generated XML file containing the meta-model for the supply chain collaboration service; and using the meta-model for the supply chain collaboration service contained within the accessed XML file, automatically generate the supply chain collaboration service and one or more GUIs for interaction between the collaboration service and an end-user of the collaboration service, the generated supply chain collaboration service capable of understanding of supply chain semantics for an underlying supply chain.

* * * * *